US012626064B2

(12) United States Patent
Soares et al.

(10) Patent No.: US 12,626,064 B2
(45) Date of Patent: May 12, 2026

(54) META-REFLECTION TECHNIQUES FOR LEARNING INSTRUCTIONS FOR LANGUAGE AGENTS USING PAST SELF-REFLECTIONS

(71) Applicant: Microsoft Technology Licensing, LLC, Redmond, WA (US)

(72) Inventors: Gustavo Araujo Soares, Redmond, WA (US); Sumit Gulwani, Sammamish, WA (US); Shashank Kirtania, Bengaluru (IN); Sherry Shi, Redmond, WA (US); Arjun Radhakrishna, Seattle, WA (US); Ananya Singha, Ranchi (IN); Priyanshu Gupta, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 18/642,905

(22) Filed: Apr. 23, 2024

(65) Prior Publication Data

US 2025/0328735 A1 Oct. 23, 2025

(51) Int. Cl.
*G06F 17/00* (2019.01)
*G06F 40/30* (2020.01)

(52) U.S. Cl.
CPC .................................... *G06F 40/30* (2020.01)

(58) Field of Classification Search
None
See application file for complete search history.

(56) References Cited

U.S. PATENT DOCUMENTS

2022/0343897 A1* 10/2022 Agarwal .................. G08G 5/26
2023/0103382 A1* 4/2023 Lu ......................... G10L 15/197
704/232

(Continued)

OTHER PUBLICATIONS

"HashiCorp", Retrieved From: https://www.terraform.io/, 2023, 5 Pages.

(Continued)

*Primary Examiner* — Satwant K Singh
(74) *Attorney, Agent, or Firm* — NovoTechIP International PLLC

(57) ABSTRACT

A data processing system implements accessing a datastore of training data using a model training unit to obtain a first training sample, the first training sample comprising a first natural language utterance, first ground truth information, the first natural language utterance requesting that content be generated by a language model, the first ground truth information providing a first example of first expected output of the language model in response to the first natural language utterance; constructing a first prompt based on the first natural language utterance using a prompt construction unit; providing, using the prompt construction unit, the first prompt to the language model as an input to cause the language model to generate a first output; analyzing the first output and the first ground truth information using the model training unit to determine whether the first output is erroneous; constructing, using the prompt construction unit, a second prompt that instructs the language model to generate a first self-reflection response that indicates why the language model generated the first output; providing the second prompt as an input to the language model to cause the language model to generate the first self-reflection response; constructing, using the prompt construction unit, a third prompt that includes the first self-reflection response, the third prompt instructing the language model to generate (Continued)

prompt improvement instructions to be included in subsequently constructed prompts for the language model to assist the language model in generating a correct response to the subsequently constructed prompts; providing the third prompt to the language model to cause the language model to generate the prompt improvement instructions; and including the prompt improvement instructions in the subsequently constructed prompts generated using the prompt construction unit.

20 Claims, 10 Drawing Sheets

(56) References Cited

U.S. PATENT DOCUMENTS

| | | | | |
|---|---|---|---|---|
| 2023/0130844 | A1* | 4/2023 | de la Rey | G10L 25/30 704/232 |
| 2024/0135934 | A1* | 4/2024 | Zhao | G06N 3/0442 |
| 2024/0169981 | A1* | 5/2024 | Huang | G10L 15/16 |
| 2024/0347064 | A1* | 10/2024 | Li | G06N 3/045 |

OTHER PUBLICATIONS

"Tenable", Retrieved From:https://www.tenable.com/terrascan, 2023, 4 Pages.
Achiam, et al., "GPT-4 Technical Report," arXiv, arXiv:2303.08774v4 [cs.CL], Dec. 19, 2023, 100 pages.
Anil, et al., "PaLM 2 Technical Report", In Repository of arXiv:2305.10403v1, 2023, pp. 1-93.
Bai, et al., "Constitutional AI: Harmlessness from AI Feedback", In Repository of arXiv:2212.08073v1, Dec. 15, 2022, 34 Pages.
Brown, et al., "Language Models are Few-Shot Learners", In the Proceedings of the 34th International Conference on Neural Information Processing Systems, Dec. 6, 2020, 25 Pages.
Deng, et al., "Rlprompt: Optimizing discrete text prompts with reinforcement learning." arXiv preprint arXiv:2205.12548, Oct. 22, 2022, 23 Pages.
Kin, et al., "Language models can solve computer tasks.", Advances in Neural Information Processing Systems, 2023, 30 Pages.
Ouyang, et al., "AutoPlan: Automatic Planning of Interactive Decision-Making Tasks With Large Language Models.", The 2023 Conference on Empirical Methods in Natural Language Processing, 2023, 15 Pages.
Parnin, et al., "Building Your Own Product Copilot: Challenges, Opportunities, and Needs." arXiv preprint arXiv:2312.14231, Dec. 21, 2023, 11 Pages.
Poesia, et al., "Synchromesh: Reliable code generation from pre-trained language models", In repository of arXiv:2201.11227v1, Jan. 26, 2022, pp. 1-19.
Pryzant, et al., "Automatic prompt optimization with" gradient descent "and beam search.", arXiv preprint arXiv:2305.03495, Oct. 19, 2023, 12 Pages.
Qin, et al., "Tool learning with foundation models.", arXiv preprint arXiv:2304.08354, Jun. 15, 2023, 75 Pages.
Shinn, et al., "Reflexion: Language agents with verbal reinforcement learning.", Advances in Neural Information Processing Systems, 2023, 19 Pages.
Sun et al., "Adaplanner: Adaptive planning from feedback with language models.", Advances in Neural Information Processing Systems, 2023, 44 Pages.
Wei, et al., "Chain-of-Thought Prompting Elicits Reasoning in Large Language Models", In Proceedings of 36th Conference on Neural Information Processing Systems, Dec. 6, 2022, 14 Pages.
White, et al., "A prompt pattern catalog to enhance prompt engineering with chatgpt.", arXiv preprint arXiv:2302.11382, Feb. 21, 2023, 19 Pages.
Wu, et al., "Autogen: Enabling next-gen llm applications via multi-agent conversation framework" arXiv preprint arXiv:2308.08155, Oct. 3, 2023, pp. 1-43.
Yang, et al., "HotpotQA: A Dataset for Diverse, Explainable Multi-Hop Question Answering", In Proceedings of the Conference on Empirical Methods in Natural Language Processing, Oct. 31, 2018, pp. 2369-2380.
Yang, et al., "Large language models as optimizers.", arXiv preprint arXiv:2309.03409, Dec. 7, 2023, pp. 1-42.
Yao, et al., "Tree of Thoughts: Deliberate Problem Solving with Large Language Models", In Repository of arXiv:2305.10601v1, May 17, 2023, 11 Pages.
Yao, et al.,"ReAct: Synergizing Reasoning and Acting in Language Models", In Foundation Models for Decision Making Workshop at Neural Information Processing Systems, Dec. 3, 2022, pp. 1-31.
Ye et al., "Prompt engineering a prompt engineer.", arXiv preprint arXiv:2311.05661, Feb. 19, 2024, pp. 1-31.
Zamfirescu-Pereira, et al., "Why Johnny can't prompt: how non-AI experts try (and fail) to design LLM prompts.", Proceedings of the 2023 CHI Conference on Human Factors in Computing Systems, 2023, 21 Pages.
Zhang, et al., "Auto-instruct: Automatic instruction generation and ranking for black-box language models.", arXiv preprint arXiv:2310.13127, Oct. 9, 2023, 18 Pages.
Zhang, et al., "Promptgen: Automatically generate prompts using generative models.", Findings of the Association for Computational Linguistics: NAACL, 2022, pp. 30-37.
Zhang, et al., "Tempera: Test-time prompting via reinforcement learning.", arXiv preprint arXiv:2211.11890, Nov. 21, 2022, pp. 1-16.
Zheng, et al., "Take a step back: Evoking reasoning via abstraction in large language models.", arXiv preprint arXiv:2310.06117, Mar. 12, 2024, pp. 1-38.
Zhou, et al., "Large language models are human-level prompt engineers.", arXiv preprint arXiv:2211.01910, Mar. 10, 2023, pp. 1-43.
Zhu, et al., "Large Language Models Can Learn Rules.", arXiv:2310.07064, Oct. 10, 2023, pp. 1-29.

* cited by examiner

Self-Reflection

Task

```
Check if the following policy is violated in the following code module
  "name": "reme_noSecurityGroupAssociated",
  "description": "Ensure that Azure Virtual Network subnet is configured with a Network Security Group"
Code:
    resource "azurerm_subnet" "gateway"{
        name                    "gateway"
        virtual_network_name    azurerm_virtual_network.vNet.name
        address_prefixes      = ["10.0.2.0/24"]

    resource "azurerm_subnet_network_security_group_association" "gateway" {
        subnet_id               = "$(azurerm_subnet.gateway.id)"
        network_security_group_id = "$(azurerm_network_security_group.gateway.id)"
```

102

Response

Violated

104

Self Reflection

Evaluation Feedback: Your response was wrong, the expected response was False

Self Reflection: I see that there is a resource
"gateway" of type "azurerm_subnet_security_group_association" that may be responsible for
configuring the network security group for the subnet. I will take care of it in the future.

106

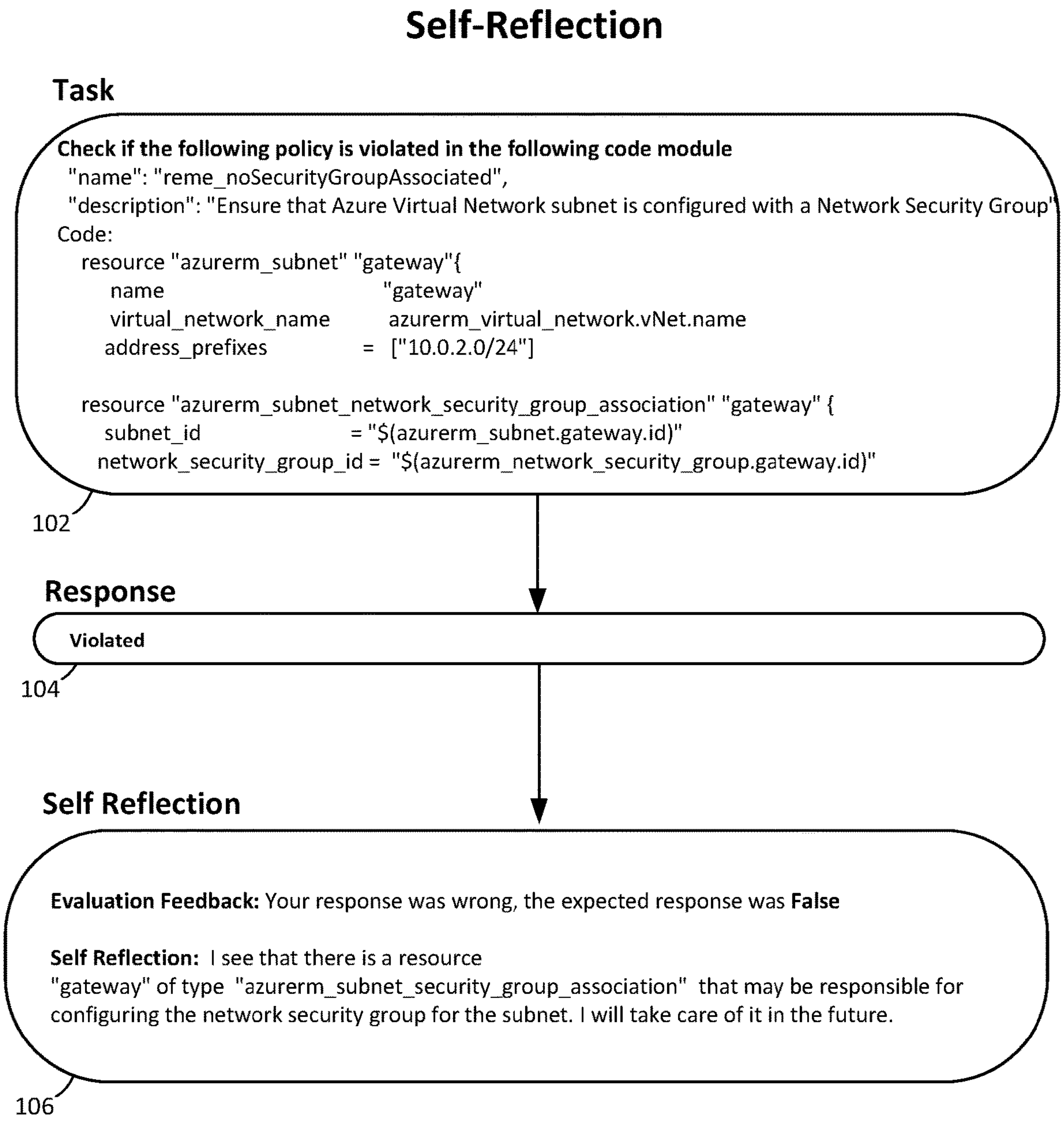

FIG. 1A

Figure 1B:
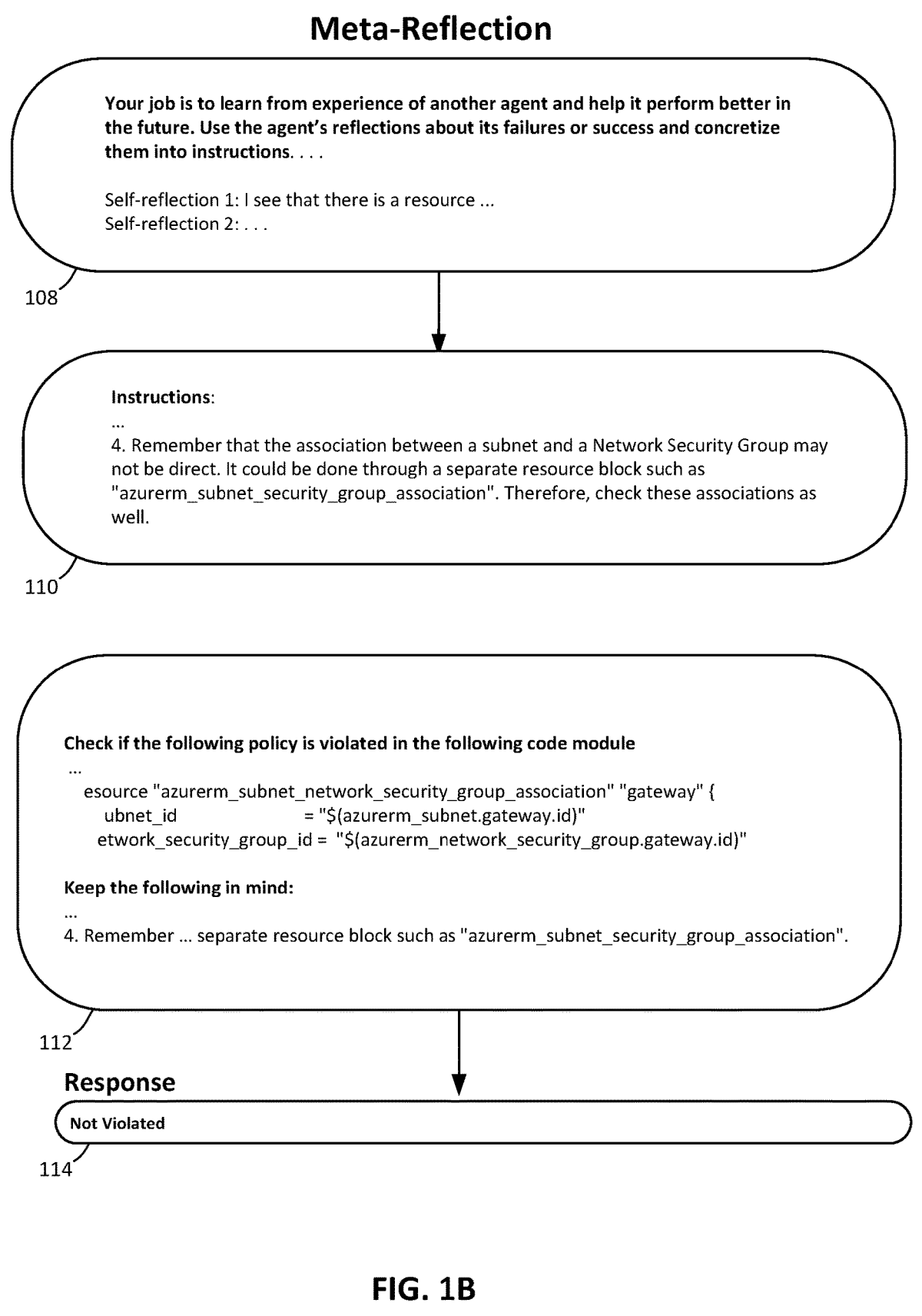

Meta-Reflection

Your job is to learn from experience of another agent and help it perform better in the future. Use the agent's reflections about its failures or success and concretize them into instructions. . . .

Self-reflection 1: I see that there is a resource ...
Self-reflection 2: . . .

108

Instructions:
...
4. Remember that the association between a subnet and a Network Security Group may not be direct. It could be done through a separate resource block such as "azurerm_subnet_security_group_association". Therefore, check these associations as well.

110

Check if the following policy is violated in the following code module

```
...
esource "azurerm_subnet_network_security_group_association" "gateway" {
  ubnet_id                  = "$(azurerm_subnet.gateway.id)"
  etwork_security_group_id = "$(azurerm_network_security_group.gateway.id)"
```

Keep the following in mind:
...
4. Remember ... separate resource block such as "azurerm_subnet_security_group_association".

112

Response

Not Violated

602
Access a datastore of training data using a model training unit to obtain a first training sample, the first training sample comprising a first natural language utterance, first ground truth information, the first natural language utterance requesting that content be generated by a language model, the first ground truth information providing a first example of first expected output of the language model in response to the first natural language utterance 604
Construct a first prompt based on the first natural language utterance using a prompt construction unit 606
Provide, using the prompt construction unit, the first prompt to the language model as an input to cause the language model to generate a first output 608
Analyze the first output and the first ground truth information using the model training unit to determine whether the first output is erroneous 610
Construct, using the prompt construction unit, a second prompt that instructs the language model to generate a first self-reflection response that indicates why the language model generated the first output 612
Provide the second prompt as an input to the language model to cause the language model to generate the first self-reflection response 614
Construct, using the prompt construction unit, a third prompt that includes the first self-reflection response, the third prompt instructing the language model to generate prompt improvement instructions to be include in subsequently constructed prompts for the language model to assist the language model in generating a correct response to the subsequently constructed prompts 616
Provide the third prompt to the language model to cause the language model to generate the prompt improvement instructions 618
Include the prompt improvement instructions in the subsequently constructed prompts generated using the prompt construction unit

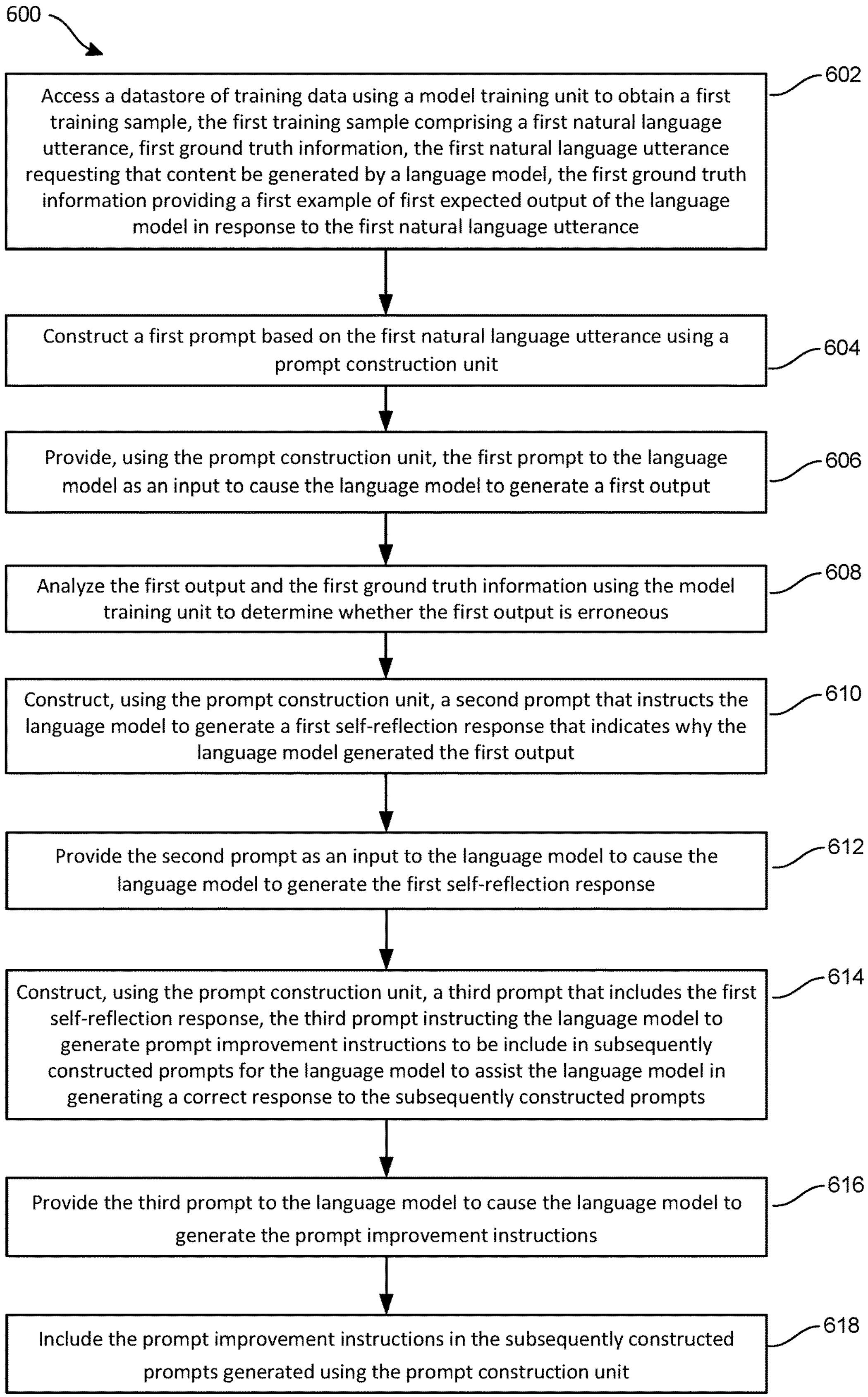

642
Receive a first natural language utterance, the first natural language utterance being input by a user via a user interface of an application 644
Construct a first prompt based on the first natural language utterance using a prompt construction unit 646
Provide, using the prompt construction unit, the first prompt to a language model as an input to cause the language model to generate a first output based on the first natural language utterance 648
Provide the first output to the application to cause the application to present the first output on the user interface of the application 650
Receive feedback from the user of the application via the user interface in response to the first output, the feedback indicating that the first output was erroneous 652
Construct, using the prompt construction unit, a second prompt that indicates that the first output was erroneous and instructs the language model to generate a first self-reflection response that indicates why the language model generated the first output 654
Provide, using the prompt construction unit, the second prompt as an input to the language model to cause the language model to generate a second self-reflection response 656
Construct, using the prompt construction unit, a third prompt that includes the first self-reflection response, the third prompt instructing the language model to generate prompt improvement instructions based on the first self-reflection response 658
Provide the third prompt to the language model to cause the language model to generate the prompt improvement instructions 660
Include the prompt improvement instructions in subsequently constructed prompts generated using the prompt construction unit

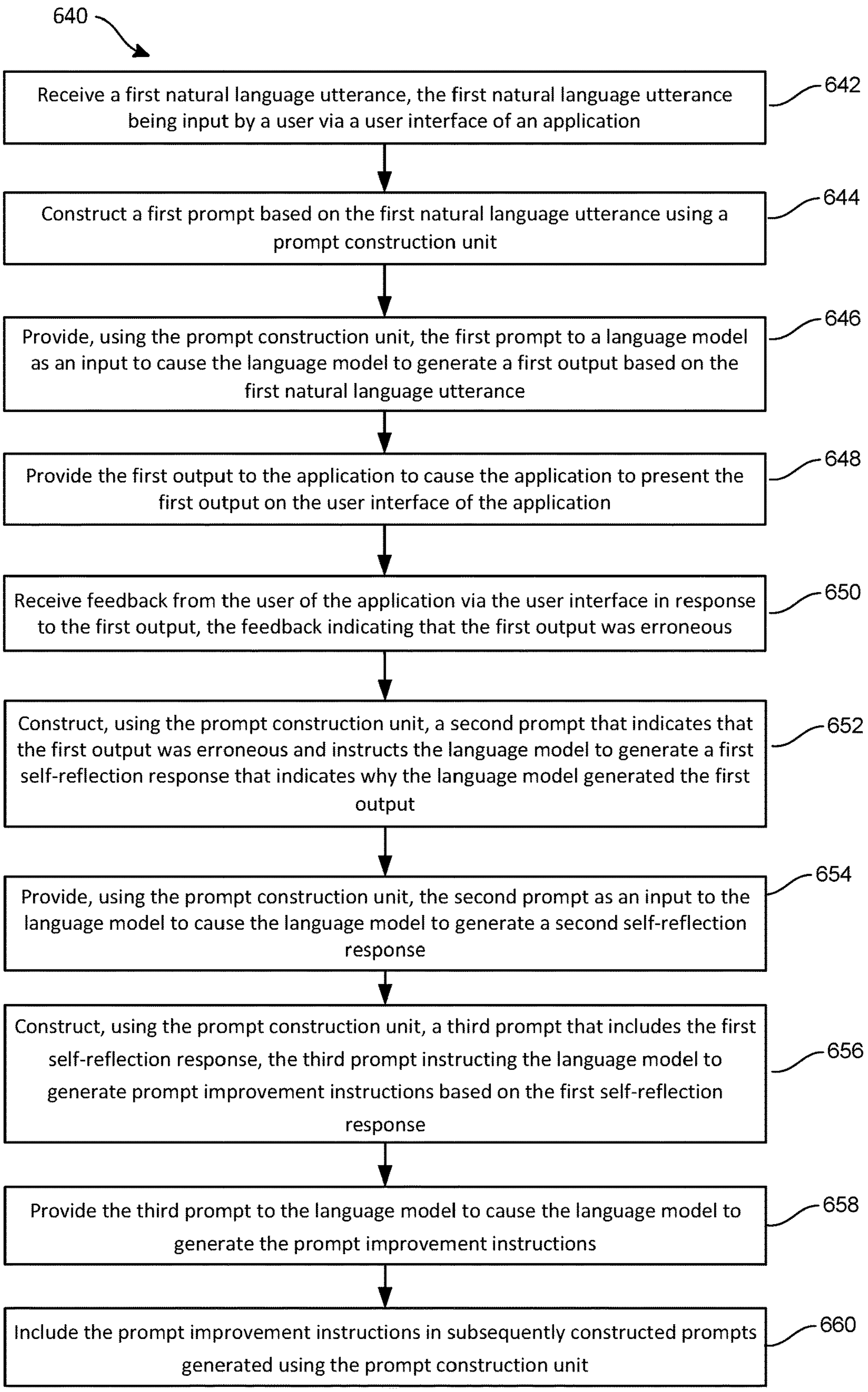

FIG. 6B

META-REFLECTION TECHNIQUES FOR LEARNING INSTRUCTIONS FOR LANGUAGE AGENTS USING PAST SELF-REFLECTIONS

BACKGROUND

Despite the popularity of Large Language Models (LLMs), creating specific prompts for LLMs to perform particular tasks remains challenging. Users often engage in multiple conversational turns with an LLM-based agent to accomplish their intended task. Consequently, significant computing resources and user time can be consumed attempting to reach convergence between the LLM output and the user's desired outcome. Hence there is a need for improved systems and methods that provide means for more efficiently assisting the user and the LLM to perform the user's intended task.

SUMMARY

An example data processing system according to the disclosure includes a processor and a memory storing executable instructions. The instructions when executed cause the processor alone or in combination with other processors to perform operations including receiving feedback from a user of the application via the user interface of the application in response to the second output, the feedback indicating that the second output was erroneous; constructing, using the prompt construction unit, a fifth prompt that indicates that the second output was erroneous and instructs the language model to generate a second self-reflection response that indicates why the language model generated the second output; providing, using the prompt construction unit, the fifth prompt as an input to the language model to cause the language model to generate the second self-reflection response; constructing, using the prompt construction unit, a sixth prompt that includes the second self-reflection response and the prompt improvement instructions, the third prompt instructing the language model to update the prompt improvement instructions based on the second self-reflection response; and providing the sixth prompt to the language model to cause the language model to update the prompt improvement instructions.

An example method implemented in a data processing system includes receiving feedback from a user of the application via the user interface of the application in response to the second output, the feedback indicating that the second output was erroneous; constructing, using the prompt construction unit, a fifth prompt that indicates that the second output was erroneous and instructs the language model to generate a second self-reflection response that indicates why the language model generated the second output; providing, using the prompt construction unit, the fifth prompt as an input to the language model to cause the language model to generate the second self-reflection response; constructing, using the prompt construction unit, a sixth prompt that includes the second self-reflection response and the prompt improvement instructions, the third prompt instructing the language model to update the prompt improvement instructions based on the second self-reflection response; and providing the sixth prompt to the language model to cause the language model to update the prompt improvement instructions.

An example data processing system according to the disclosure includes a processor and a memory storing executable instructions. The instructions when executed cause the processor alone or in combination with other processors to perform operations including receiving a first natural language utterance, the first natural language utterance being input by a user via a user interface of an application; constructing a first prompt based on the first natural language utterance using a prompt construction unit; providing, using the prompt construction unit, the first prompt to a language model as an input to cause the language model to generate a first output based on the first natural language utterance; providing the first output to the application to cause the application to present the first output on the user interface of the application; receiving feedback from the user of the application via the user interface in response to the first output, the feedback indicating that the first output was erroneous; constructing, using the prompt construction unit, a second prompt that indicates that the first output was erroneous and instructs the language model to generate a first self-reflection response that indicates why the language model generated the first output; providing, using the prompt construction unit, the second prompt as an input to the language model to cause the language model to generate a second self-reflection response; constructing, using the prompt construction unit, a third prompt that includes the first self-reflection response, the third prompt instructing the language model to generate prompt improvement instructions based on the first self-reflection response; providing the third prompt to the language model to cause the language model to generate the prompt improvement instructions; and including the prompt improvement instructions in subsequently constructed prompts generated using the prompt construction unit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1A and 1B are diagrams showing examples of self-reflection and meta-reflection to improve the content generated by a language model according to the techniques herein.

FIG. 6A is a flow chart of an example process for improving content generated by a language model according to the techniques disclosed herein.

FIG. 6B is a flow chart of another example process for improving content generated by a language model according to the techniques disclosed herein.

DETAILED DESCRIPTION

Figure 2:
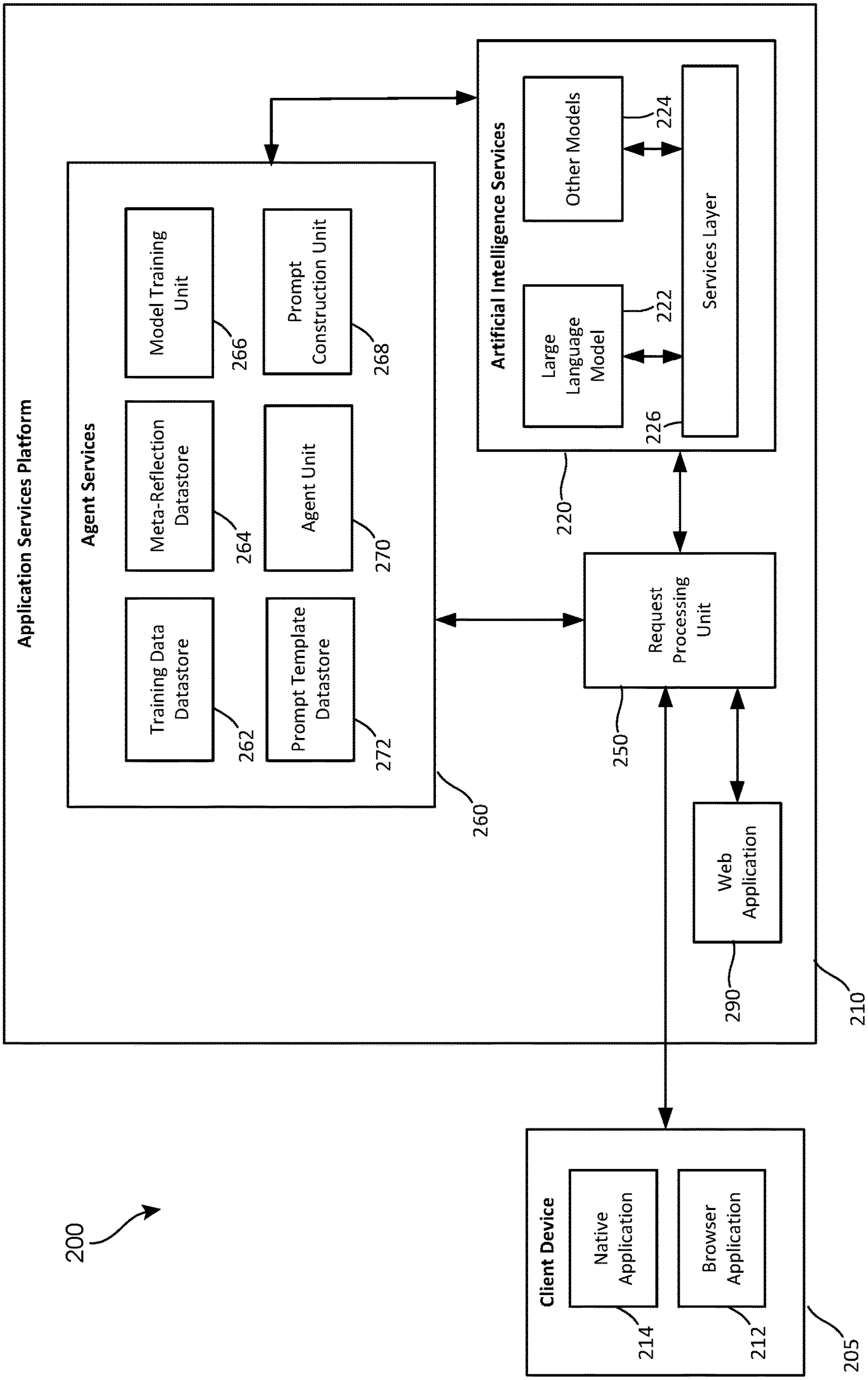
FIG. 2 is a diagram of an example computing environment in which the techniques provided herein are implemented.

Systems and methods for using meta-reflection techniques to improve prompt construction are provided herein. These techniques solve the technical problems associated with efficient prompt construction. LLMs, such as GPT-4, have gained significant popularity recently due to the ability of these models to generate human-like text and to solve complex problems. Users typically interact with these models by constructing prompts that provide instructions to the model to perform specific tasks. However, the process of crafting specific prompts is not a trivial one. Prompt engineers often spend significant amounts of time and computing resources attempting to optimize prompts for specific tasks. This optimization process is often a time-consuming iterative process that results in delays and inefficiencies as the user attempts to further refine a prompt to try to reach a desired outcome.

The techniques herein rely on meta-reflection to automatically improve prompt construction. Prompts can include more than explicit instructions to the language model to perform specified tasks. The prompts can include additional material that provides context to the language model, such as but not limited to documentation, examples, and other relevant inputs. These additional materials can provide the model with contextual information that provides a more nuanced and comprehensive understanding of the task to be performed.

The techniques herein rely on self-reflection by the model to generate additional contextual information that can improve the content generated by the model. Self-reflection, as used herein, refers to a verbal reinforcement technique in which the model is prompted to reflect on its mistakes. The self-reflective text generated by the model is stored in the episodic memory of the model to improve future trajectories on the same task. While self-reflection can significantly improve a language agent's performance, it is an online reinforcement process that depends on the availability of performing multiple turns with a feedback mechanism. The meta-reflection techniques provided herein build upon and utilize past self-reflections to learn verbal instructions that are provided to the language agent to improve the output by the models. The meta-reflection techniques provided herein gather and generalize the past self-reflections generated by the language model into "meta-reflections" that take the form of additional instructions to the language agent that improve the performance of the language model. These instructions are automatically included in the prompts submitted to the language model. The instructions generated are general and not specific to a particular instance of a task to be performed. However, the instructions can be customized for specific subject-matter domains to provide appropriate guidance to the language model when generating content based on utterances associated with these subject-matter domains. Furthermore, some implementations the meta-reflection instructions are generated during a training phase of the language model. The meta-reflection instructions are then included in prompts constructed during the inference phase of the language model. A technical benefit of this approach is that no feedback mechanism is required during the inference phase and the self-reflective feedback generated during the training phase is used to improve performance of the language model absent such a feedback mechanism. Processing natural language utterances using a language model is computationally intensive, but the techniques herein can significantly reduce the computational resources utilized to generate content by improving the likelihood that the content generated satisfies the user intent expressed in a natural language utterance. The user is less likely to submit further prompts requesting that the language model further refine results, which would consume further computing resource. The techniques herein can be extended to implementations that provide a feedback mechanism, and the meta-reflection instructions can be created and/or refined during the training phase as discussed in the examples which follow. A technical benefit of this approach is that the performance of the language model can continue to be improved during the inference phase by continuing to refine the meta-reflection instructions. These and other technical benefits of the techniques disclosed herein will be evident from the discussion of the example implementations that follow.

FIGS. 1A and 1B are diagrams showing examples of self-reflection and meta-reflection to improve the content generated by a language model according to the techniques herein. In some implementations, the language model is a generative model that is trained to receive a textual prompt and to generate a textual output in response to the prompt. The language model may be an LLM and the LLM may be implemented using a Generative Pre-trained Transformer (GPT) model, such as but not limited to the GPT-3 or GPT-4 models. Other implementations utilize other such models for generating content in response to prompts based on natural language utterances input by a user. The natural language utterance may be input using voice and/or text input.

FIG. 1A shows an example of a task that has been entered as a natural language prompt to a language model-based agent. An agent utilizes the language model to understand problems to be solved, and develop plans to solve these problems. The agent includes memory for storing information used for reasoning through the problems. In the example shown in FIG. 1A, the task is from a training sample selected from a training dataset used to train the language model. The training sample includes a natural language utterance requesting that the language model generate specific content, which can include analyzing content and generating a prediction based on the content. The training sample also includes ground truth information that provides an example of the expected output of the language model in response to a prompt based on the natural language utterance. The ground truth is compared with the output generated by the agent in response to the prompt to determine whether the output was correct or erroneous.

The example prompt shown in FIG. 1A tasks the agent to determine whether a code module included in the natural language prompt has violated a security policy. The security policy is also provided in the prompt. In operation 102, the natural language utterance is obtained. In this example, the natural language utterance is obtained from sample data, but in other implementations discussed later, the natural language utterance may be input by a user. The agent provides the prompt to the language model as an input, and the language model outputs a response 104 that asserts that the policy was violated. However, when compared with the ground truth information, the response 104 is erroneous. In response to this erroneous response, the language model is prompted to self-reflect in operation 106 on why the response provided by the language model was incorrect. The language model generates a self-reflection information that provides a prediction of why the content generated by the model was erroneous. This self-reflection information provides a basis for generating meta-reflection instructions that can be used to improve the performance of the language model, as shown in FIG. 1B.

In the example operation 108, the agent is prompted to learn from past self-reflections, such as the self-reflection from operation 106, and to generate or update a set of instructions that can be included in the prompts submitted to the language model in subsequently constructed prompts. The self-reflections can be stored in a persistent datastore that is accessible by the agent and can be queried for self-reflection information. The instructions can include positive instructions providing context to the language model to reinforce correct inferences in response to the subsequently constructed prompts. The instructions can also include negative instructions for providing context to the language model to help the language model correctly respond to the subsequently constructed prompts in instances where the language model responded incorrectly in the past. The additional context provided by the instruction help the language model avoid making the same mistakes again in the future. The past self-reflections are analyzed by the agent to generate the meta-reflection instructions. As shown in operation 108, the past self-reflections can be included in the prompt to the language model and the language model generates a generalization of the previous self-reflections in the form of instructions. If instructions have already been created, the instructions can be included in the prompt to the language model so that the model can update the existing instructions by either adding to or recreating the instructions.

The instructions take the form of a list in some implementations to facilitate updating the instructions as shown in operation 110. FIG. 1B, operation 110 shows a list of sample instructions generated in response to the prompt in operation 108. New items based on the self-reflection information can be added to the list as the instructions. Furthermore, the agent can prompt the language model to revise and shorten the list by combining items in the list. A technical benefit of this approach is that the list can be easily created and/or updated using the language model as self-reflection information is created in response to correct and/or erroneous responses by the language model. As a result, the instructions can be iteratively constructed during the training phase as the various training samples in the training dataset are processed. A technical benefit of this approach is that the instructions are constructed during the training phase and the inference phase does not require a feedback mechanism for collecting feedback from users. However, some implementations extend the techniques herein to the inference phase and include such a feedback mechanism that can be used to further refine the instructions that the agent provides to the model when constructing subsequent prompts to be submitted to the language model.

FIG. 1B operation 112 shows an example of the instructions developed in the previous operation being included when constructing the prompt. The prompt submitted in operation 102 is being resubmitted with the instructions to determine whether the instructions help the agent to reach the correct conclusion. The response 114 returned by the agent indicates that the policy was not violated, which is the correct response. The process of developing the instructions can be an iterative one. The instructions can also be tested as they are developed and further refined if the instructions have not improved the results being obtained from the language model.

FIG. 2 is a diagram of an example computing environment 200 in which the techniques described herein are implemented. The example computing environment 200 includes a client device 205 and an application services platform 210. The application services platform 210 provides one or more cloud-based applications and/or provides services to support one or more web-enabled native applications on the client device 205. These applications may include but are not limited to design applications, communications platforms, visualization tools, collaboration tools for collaboratively creating visual representations of information, development tools, and other applications for consuming and/or creating electronic content. These applications can utilize the language models and/or other generative models to generate content that can be utilized in the application. The applications provide a user interface that enables users to interact with an agent through natural language prompts to create and/or modify content using the various models provided by the artificial intelligence (AI) services 220. The meta-reflection techniques provided herein can be used to create and/or refine instructions to be included in prompts provided to the language model by the agent. The client device 205 and the application services platform 210 communicate with each other over a network (not shown). The network may be a combination of one or more public and/or private networks and may be implemented at least in part by the Internet.

The application services platform 210 includes a request processing unit 250, artificial intelligence (AI) services 220, agent services 260, and a web application 290. The request processing unit 250 is configured to receive requests from an application implemented by the native application 214 of the client device 205, the browser application 212, and/or the web application 290 of the application services platform 210. The requests may include but are not limited to requests to generate new content, modify existing content, and/or perform other actions as discussed in the examples which follow. In some implementations, the web application 290 of the application services platform 210 implements this functionality of the design application. In other implementations, at least a portion of this functionality is implemented by the native application 214 of the client device 205. The request processing unit 250 also coordinates communication and exchange of data among components of the application services platform 210 as discussed in the examples which follow.

The agent services 260 implement the meta-reflection techniques provided herein. The agent services 260 includes a training data datastore 262, a meta-reflection datastore 264, a model training unit 266, a prompt construction unit 268, an agent unit 270, and a prompt template datastore 272. The training data datastore 262 is a persistent datastore that stores a set of training samples that are used during the training phase to train the language model and to generate the meta-reflection instructions disclosed herein. The training samples include a natural language utterance used to construct a prompt to be provided as an input to the language model and ground truth information that provides an example of the expected output of the language model in response to a prompt based on the natural language utterance.

The meta-reflection datastore 264 is a persistent datastore that stores the self-reflection information generated by the language model and the meta-reflection instructions based on the self-reflection information. The meta-reflection instructions can include general instructions for inclusion in prompts constructed by the prompt construction unit 268. The meta-reflection instructions can also include general instructions that are specific to a specific subject matter domain. The prompt construction unit 268 can analyze the natural language utterance to determine a subject matter of the natural language utterance and determine whether the training data datastore 262 includes any subject-matter specific instructions. The prompt construction unit 268 combines the subject-matter specific instructions with the general instructions in some implementations.

Figure 3:
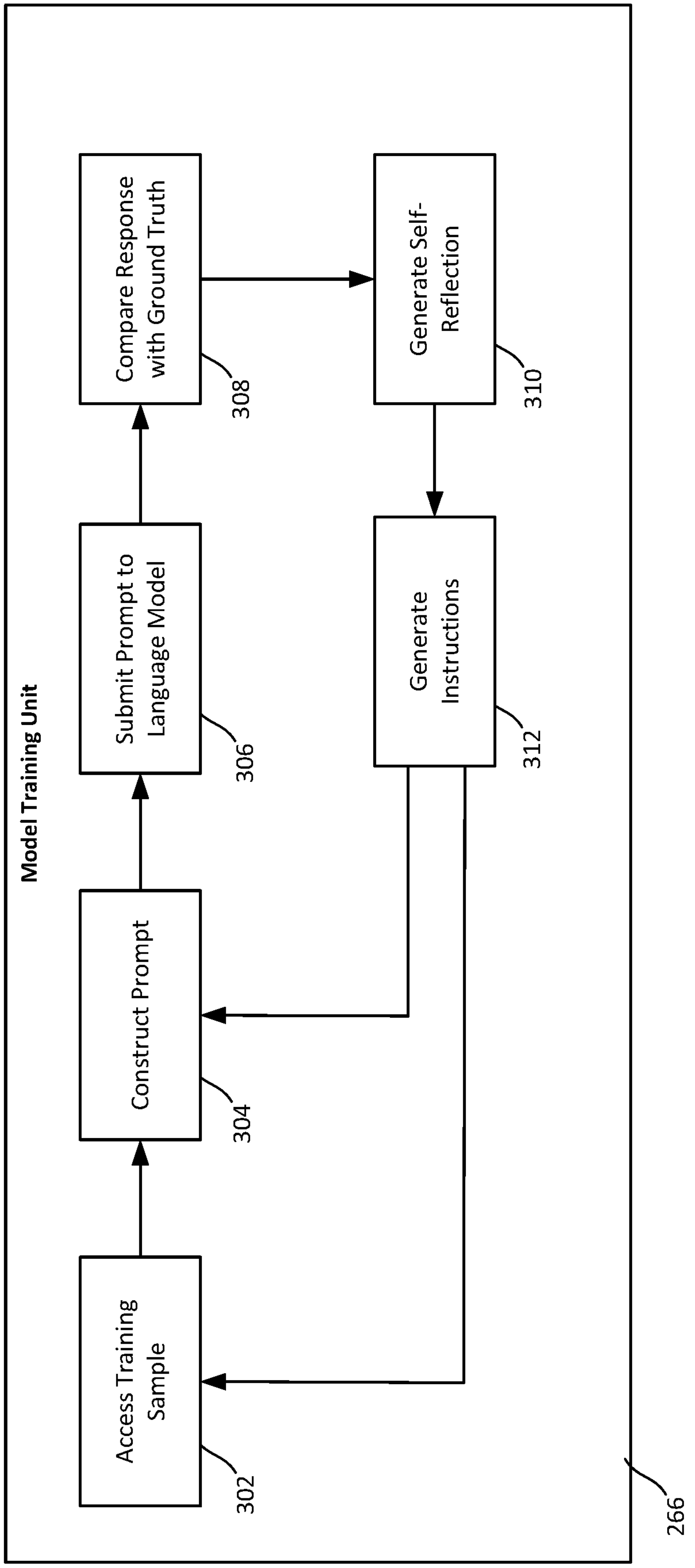
FIG. 3 shows additional details of the model training unit shown in FIG. 2.

The model training unit 266 selects training data samples from the training data datastore 262 and provides the selected training data samples to the prompt construction unit 268 to construct and submit a prompt based on the natural language utterances associated with each training sample. The prompt construction unit 268 obtains the meta-reflection instructions from the meta-reflection datastore 264, if any have already been created. The prompt construction unit 268 constructs a prompt that includes the natural language utterance and the meta-reflection instructions where available and provides the prompt to the large language model (LLM) 222 as an input. The LLM 222 generates content in response to the prompt and the prompt construction unit provides the generated prompt to the model training unit 266 for analysis. The model training unit 266 then compares the content generated by the ground truth information to determine whether the content generated is correct or erroneous. The model training unit 266 then instructs the prompt construction unit 268 to construct a prompt to cause the LLM 222 to self-reflect to obtain self-reflection information and the model training unit 266 instructs the prompt construction unit 268 to generate and/or update the meta-reflection instructions. Additional details of the model training unit 266 are shown in FIG. 3, which is discussed in detail in the examples which follow.

The prompt template datastore 272 is a persistent datastore that stores prompt templates that can be used by the prompt construction unit 268 to when constructing various prompts to provide as an input the LLM 222. The prompt templates have been engineered to provide optimal results for performing various tasks using the LLM. The prompt construction unit 268 can add information obtained from the model training unit 266, the agent unit 270, the training data datastore 262, and/or the meta-reflection datastore 264 to the prompt templates to provide the LLM 222 with contextual information regarding a task to be performed.

Figure 4:
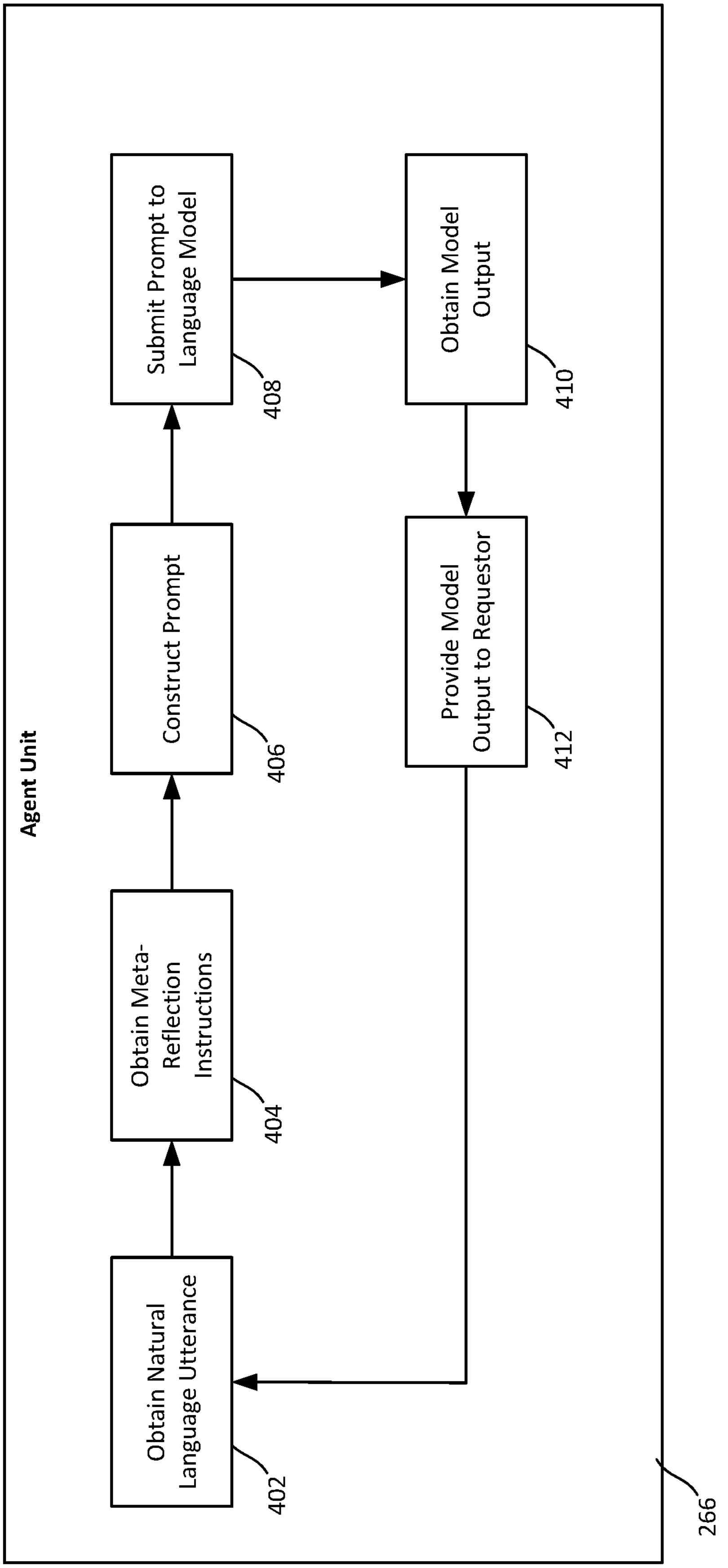
FIG. 4 shows additional details of the agent unit shown in FIG. 2.
Figure 5:
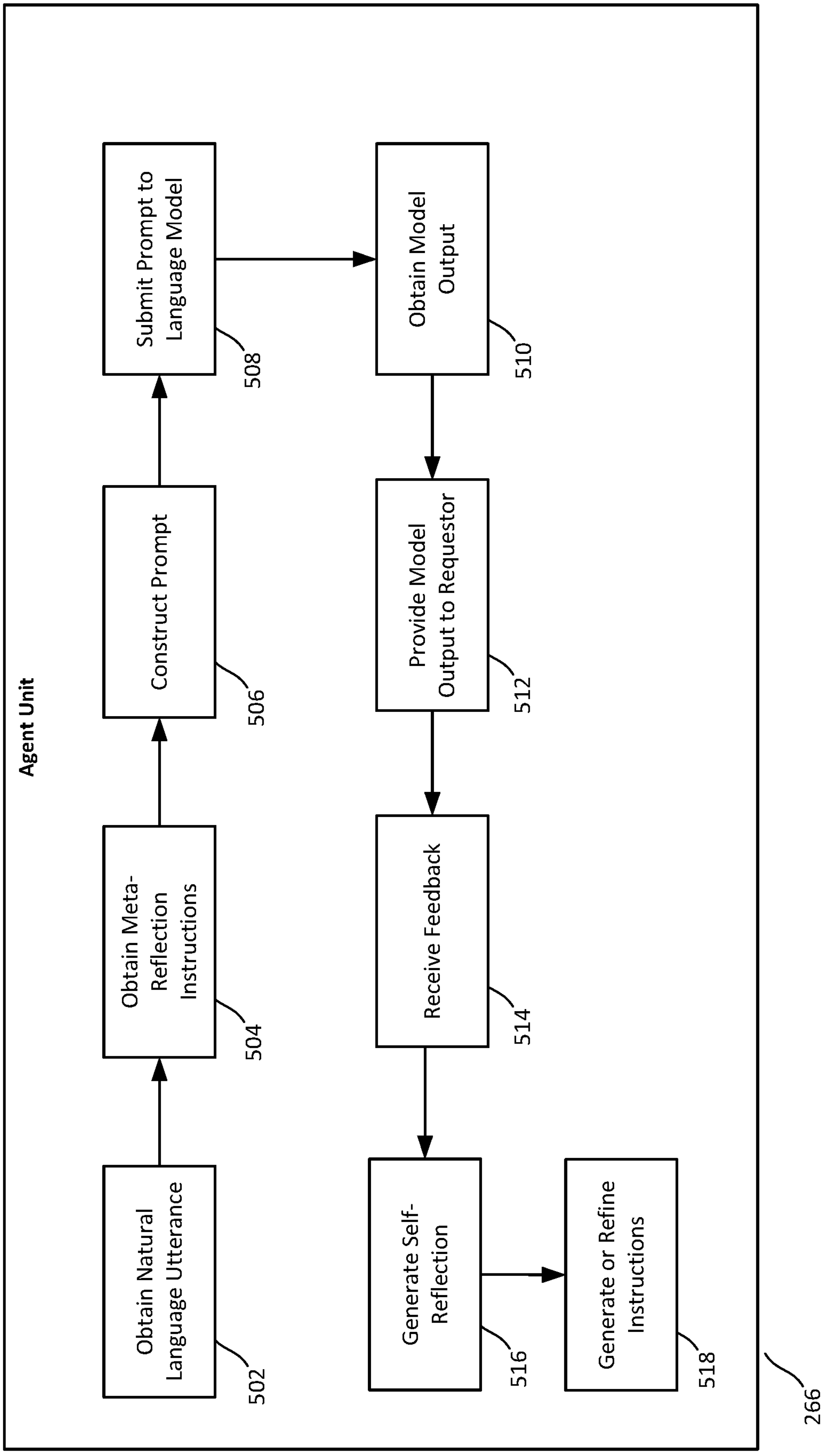
FIG. 5 shows further details of the agent unit shown in FIG. 2.

The agent unit 270 coordinates interactions between users and the LLM 222 during the inference phase once the training phase has been completed. The agent unit 270 receives the natural language utterances from a user interface of the native application 214 and/or the web application 290 and provides these utterances to the prompt construction unit 268 to construct prompts to be provided to the LLM 222. Additional details of the agent unit 270 are shown in FIGS. 4 and 5, which are described in detail in the examples which follow.

The AI services 220 provide various machine learning models that analyze and/or generate content. The AI services 220 include the LLM 222 and other generative models 224 in the example implementation shown in FIG. 2. The other generative models 224 may include but are not limited to models trained to generate imagery, video, audio, and/or other types of content based on natural language prompt and/or other types of input. The LLM 222 and/or the other generative models 224 provide services to the various components of the application services platform 210. The LLM 222 may be implemented using a Generative Pre-trained Transformer (GPT) model, such as but not limited to the GPT-3 or GPT-4 models. Other implementations utilize other type of models implementing the LLM 222, which is trained to generate various types of textual content in response to prompts constructed to instruct the LLM 222.

The services layer 226 receives requests to present a prompt to the models of the AI services 220 from the request processing unit 250 and/or the agent services 260. The prompts include natural language prompts entered by a user of the native application 214 or the web application 290. The prompts also include prompts generated by components of the agent services 260, including but not limited to the prompt construction unit 570. The services layer 226 formats the natural language prompts in a format that is recognized by each of the models in some implementations. The services layer 226 also routes any content generated by the models to the source of the request, which includes the agent services 260 or request processing unit 250.

The client device 205 is a computing device that may be implemented as a portable electronic device, such as a mobile phone, a tablet computer, a laptop computer, a portable digital assistant device, a portable game console, and/or other such devices in some implementations. The client device 205 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 2 includes a single client device 205, other implementations may include a different number of client devices that utilize services provided by the application services platform 210.

The client device 205 includes a native application 214 and a browser application 212. The native application 214 is a web-enabled native application, in some implementations, implements an application that can utilize the services of the agent services 260 as discussed above. The browser application 212 can be used for accessing and viewing web-based content provided by the application services platform 210. In such implementations, the application services platform 210 implements one or more web applications, such as the web application 290. The application services platform 210 supports both the native application 214 and a web application 290 in some implementations, and the users may choose which approach best suits their needs.

FIG. 3 shows additional details of the model training unit 266 shown in FIG. 2. The model training unit 266 implements a training pipeline shown in FIG. 2. In operation 302, the model training unit 266 accesses a training sample from the training data datastore 262.

In operations 304 and 306, the model provides the natural language utterance from the training sample to the prompt construction unit 268, and the prompt construction unit 268 then submits the prompt to the LLM 222. The prompt construction unit 268 may select from among a plurality of predetermined prompt templates in some implementation that have been engineered to provide optimal results. The prompt templates can be stored in the prompt template datastore 272. The model training unit 266 provides an indication of the prompt to select in some implementations. For instance, the model training unit 266 provides a first indication to the prompt construction unit 268 select a prompt template for processing natural language utterances to the prompt construction unit to construct a prompt to cause the LLM 222 to analyze the natural language utterance and generate content in response to the utterance. The model training unit 266 provides a second indication to the prompt construction unit 268 to select a prompt template to cause the LLM 222 to perform self-reflection and to generate self-reflection information. The model training unit 266 provides a third indication to the prompt construction unit 268 to cause the prompt construction unit 268 to generate or update the meta-reflection instructions based on the self-reflection information. Other type of templates may also be used in other implementations.

In operation 308, the model training unit compares the ground truth information associated with the training sample to the output obtained from the LLM 222 to make a determination whether the output from the model was correct or erroneous. The model training unit 310 instructs the prompt construction unit 268 to prompt the LLM 222 to generate self-reflection information indicative of why the LLM 222 generated the output that it did in response to the prompt. The model training unit 266 obtains the self-reflection information from the prompt construction unit 268 and stores the self-reflection information in the meta-reflection datastore 264. In operation 312, the model training unit instructs the prompt construction unit 268 to generate meta-reflection instructions to include in subsequently constructed prompts. The model training unit 266 may then return to operation 304 to test whether the instructions generated or updated in operation 312 improve the output generated by the LLM 222 for the training sample. Otherwise, if the model training unit 266 may return to operation 302 and select another training sample from the training data datastore 262 to use for training.

FIG. 4 shows additional details of an example implementation the agent unit 270 shown in FIG. 2. The agent unit 270 implements a pipeline for processing natural language prompts input by a user via a user interface of the native application 214 or the web application 290 during the inference phase in which the training has been completed and the meta-reflection instructions have already been generated and stored in the meta-reflection datastore 264 by the model training unit 266.

In operation 402, the natural language utterance is received by the agent unit 270. The request processing unit 250 of the application services platform 210 forwards the natural language prompt to the agent unit 270 of the agent services 260 from the native application 214 or the web application 290. In operation 406, the agent unit 270 instructs the prompt construction unit 268 to construct a prompt to cause the LLM 222 to analyze the natural language utterance, and to submit the prompt as an input to the LLM 222 in operation 408. The prompt construction unit 268 receives the output from the LLM 222 and provides the output to the agent unit 270 in operation 410. The agent unit 270 then provides the output from the LLM 222 to the native application 214 or the web application 290 for presentation on to the user on a user interface of the application. The agent unit 270 may then return to operation 402 in some instances and receive an additional natural language prompt input by the user.

FIG. 5 shows additional details of another example implementation of the agent unit 270 shown in FIG. 2. In this example implementation, the agent unit 270 incorporates feedback functionality into the inference phase that enables the meta-reflection instructions to be further refined based on user feedback. Operation 502 is similar to operation 402 shown in FIG. 4, operation 504 is similar to operation 404 shown in FIG. 4, operation 506 is similar to operation 406 shown in FIG. 4, operation 508 is similar to operation 408 shown in FIG. 4, operation 510 is similar to operation 410 shown in FIG. 4, and operation 512 is similar to operation 412 shown in FIG. 4.

In operation 514, feedback is received from the user in response to the model output. The feedback is input as a natural language prompt in the user interface of the native application 214 or the application 290. In operation 516, the agent unit 270 prompts instructs the prompt construction unit 268 to prompt the LLM 222 to generate self-reflection information indicative of why the LLM 222 generated the output that it did in response to the prompt. The agent unit 270 obtains the self-reflection information from the prompt construction unit 268 and stores the self-reflection information in the meta-reflection datastore 264. In operation 518, the agent unit 270 instructs the prompt construction unit 268 to generate new or update existing meta-reflection instructions to include in subsequently constructed prompts.

FIG. 6A is a flow chart of another example process 600 for improving content generated by a language model according to the techniques disclosed herein. The process 600 can be implemented by the model training unit 266 of the agent services 260 as discussed in the preceding examples. The process 600 can be used by the model training unit 266 during the training phase to generate the meta-reflection instructions that can be used to improve the performance of the LLM 222 through prompt engineering.

The process 600 includes an operation 602 of accessing a datastore of training data using a model training unit to obtain a first training sample. The datastore can be implemented by the training data datastore 262. The first training sample includes a first natural language utterance, first ground truth information. The first natural language utterance requests that content be generated by a language model, such as the LLM 222. The first ground truth information provides a first example of first expected output of the language model in response to the first natural language utterance.

The process 600 includes an operation 604 of constructing a first prompt based on the first natural language utterance using a prompt construction unit. The model training unit 266 provides the natural language utterance to the prompt construction unit 268 to construct the prompt to be provided as an input to the LLM 222.

The process 600 includes an operation 606 of providing, using the prompt construction unit, the first prompt to the language model as an input to cause the language model to generate a first output. The prompt construction unit 268 provides the prompt as an input to the LLM 222.

The process 600 includes an operation 608 of analyzing the first output and the first ground truth information using the model training unit to determine whether the first output is erroneous. The model training unit 266 compares the output from the LLM 222 with the ground truth information to determine whether the output from the LLM 222 is correct or erroneous.

The process 600 includes an operation 610 of constructing, using the prompt construction unit, a second prompt that instructs the language model to generate a first self-reflection response that indicates why the language model generated the first output and an operation 612 of providing the second prompt as an input to the language model to cause the language model to generate the first self-reflection response. The prompt construction unit 268 constructs a prompt to cause the LLM 222 to self-reflect and generate self-reflection information that indicates why the model generated the output.

The process 600 includes an operation 614 of constructing, using the prompt construction unit, a third prompt that includes the first self-reflection response. The third prompt instructing the language model to generate prompt improvement instructions to be included in subsequently constructed prompts for the language model to assist the language model in generating a correct response to the subsequently constructed prompts. The prompt construction unit 268 constructs a prompt that includes the self-reflection information obtained from the LLM 222. As discussed in the preceding examples, the prompt construction unit 268 can include multiple instances of self-reflection obtained from previous sessions with the LLM 222 that have been stored in the meta-reflection datastore 264. The prompt improvement instructions (also referred to herein as meta-reflection instructions) provide context to the LLM 222 that can help the LLM generate more accurate results.

The process 600 includes an operation 616 of providing the third prompt to the language model to cause the language model to generate the prompt improvement instructions. The LLM 222 analyzes the prompt and generates the prompt improvement instructions.

The process 600 includes an operation 618 of including the prompt improvement instructions in the subsequently constructed prompts generated using the prompt construction unit. The prompt construction unit 268 includes the prompt improvement instructions in subsequently constructed prompts as discussed in the preceding examples.

FIG. 6B is a flow chart of another example process 640 for improving predictions by a language model according to the techniques disclosed herein. The process 640 can be implemented by the agent unit 270 and/or the model training unit 266 of the agent services 260 as discussed in the preceding examples.

The process 640 includes an operation 642 of receiving a first natural language utterance, the first natural language utterance being input by a user via a user interface of an application. As discussed in the preceding examples, a user can input a natural language utterance via a user interface of the native application 214 and/or the web application.

The process 640 includes an operation 644 of constructing a first prompt based on the first natural language utterance using a prompt construction unit. The agent unit 270 provides the natural language utterance to the prompt construction unit 268 to construct a prompt as discussed in the preceding examples.

The process 640 includes an operation 646 of providing, using the prompt construction unit 268, the first prompt to a language model as an input to cause the language model to generate a first output based on the first natural language utterance. The LLM 222 generates a response to the prompt and the prompt construction unit 268 provides the response to the agent unit 270.

The process 640 includes an operation 648 of providing the first output to the application to cause the application to present the first output on the user interface of the application. The agent unit 270 provides the response received from the LLM 222 to the native application 214 or the web application 190 to present on the user interface of the application.

The process 640 includes an operation 650 of receiving feedback from the user of the application via the user interface in response to the first output, the feedback indicating that the first output was erroneous. As discussed in the preceding examples, some instance of the agent services 260 support feedback during the inference phase. The user can input a natural language prompt that indicates that the response provided by the LLM 222 was incorrect.

The process 640 includes an operation 652 of constructing, using the prompt construction unit 268, a second prompt that indicates that the first output was erroneous and instructs the language model to generate a first self-reflection response that indicates why the language model generated the first output and an operation 654 of providing, using the prompt construction unit 268, the second prompt as an input to the language model to cause the language model to generate a second self-reflection response. The LLM 222 outputs the self-reflection information The process 640 includes an operation 656 of constructing, using the prompt construction unit 268, a third prompt that includes the first self-reflection response. The third prompt instructs the language model to generate prompt improvement instructions based on the first self-reflection response.

The process 640 includes an operation 658 of providing the third prompt to the language model to cause the language model to generate the prompt improvement instructions. The LLM 222 analyzes the prompt and generates the prompt improvement instructions.

The process 640 includes an operation 660 of including the prompt improvement instructions in subsequently constructed prompts generated using the prompt construction unit. The prompt construction unit 268 includes the prompt improvement instructions in subsequently constructed prompts as discussed in the preceding examples.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
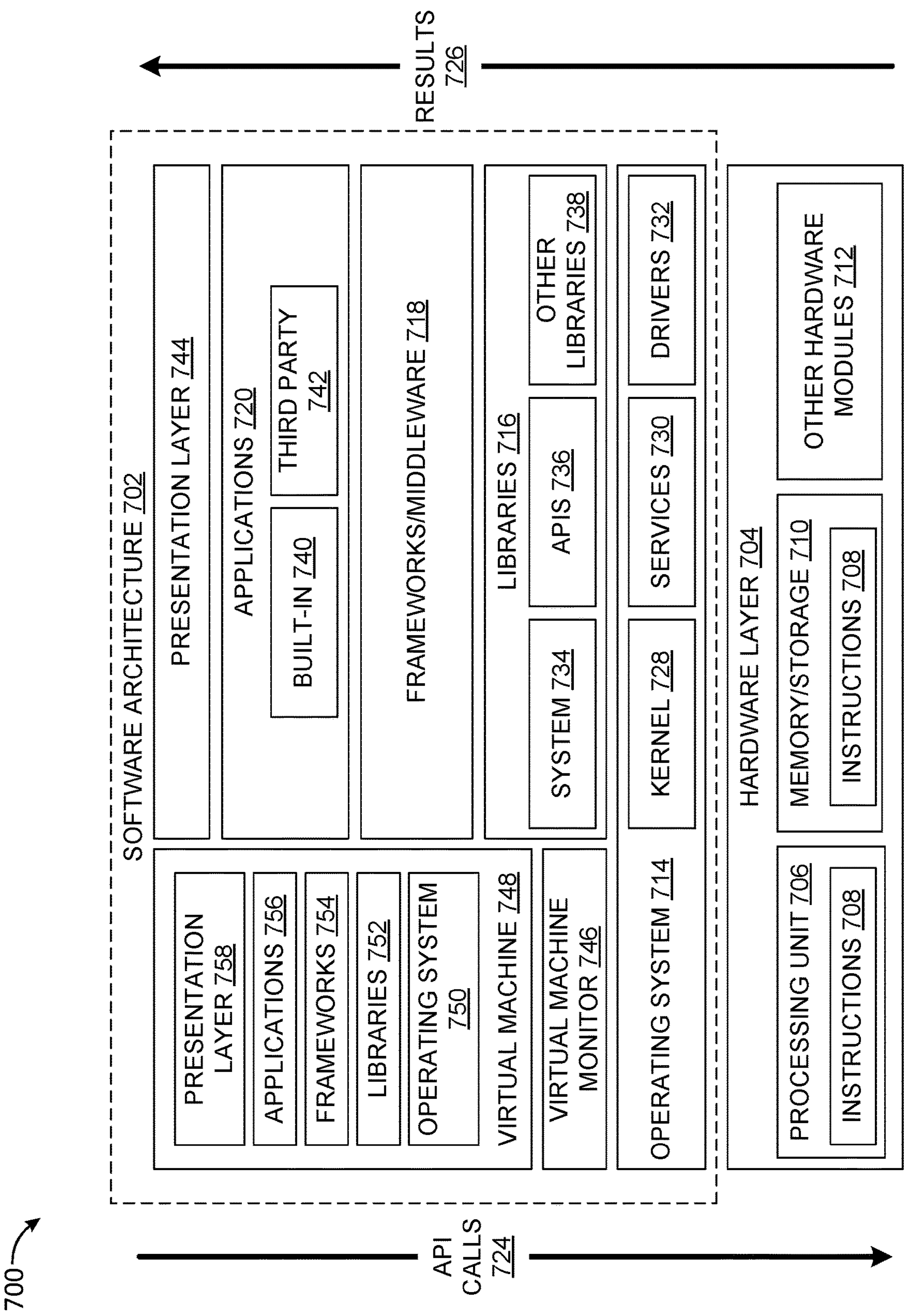
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks/middleware 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks/middleware 718 provide a higher-level common infrastructure that may be used by the applications 720 and/or other software modules. For example, the frameworks/middleware 718 may provide various graphic user interface (GUI) functions, high-level resource management, or high-level location services. The frameworks/middleware 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks/middleware 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
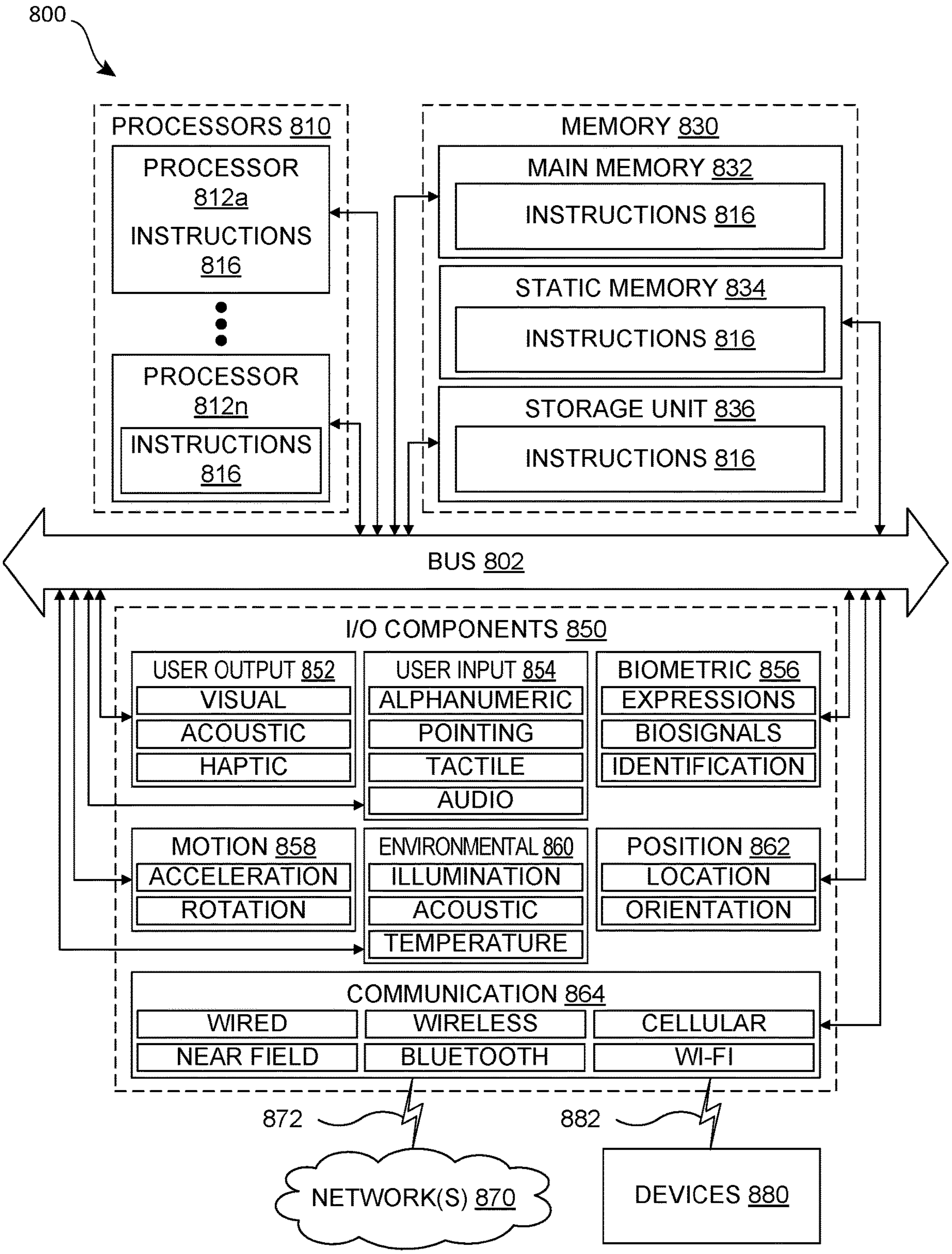
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory/storage 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multicore processor including cores that may execute instructions contemporaneously. Although FIG. 8 shows multiple processors, the machine 800 may include a single processor with a single core, a single processor with multiple cores (for example, a multicore processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “a” or “an” does not, without further constraints, preclude the existence of additional identical elements in the process, method, article, or apparatus that comprises the element. Furthermore, subsequent limitations referring back to “said element” or “the element” performing certain functions signifies that “said element” or “the element” alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

accessing a datastore of training data using a model training unit to obtain a first training sample, the first training sample comprising a first natural language utterance, first ground truth information, the first natural language utterance requesting that content be generated by a language model, the first ground truth information providing a first example of first expected output of the language model in response to the first natural language utterance;

constructing a first prompt based on the first natural language utterance using a prompt construction unit;

providing, using the prompt construction unit, the first prompt to the language model as an input to cause the language model to generate a first output;

analyzing the first output and the first ground truth information using the model training unit to determine whether the first output is erroneous;

constructing, using the prompt construction unit, a second prompt that instructs the language model to generate a first self-reflection response that indicates why the language model generated the first output;

providing the second prompt as an input to the language model to cause the language model to generate the first self-reflection response;

constructing, using the prompt construction unit, a third prompt that includes the first self-reflection response, the third prompt instructing the language model to generate prompt improvement instructions to be included in subsequently constructed prompts for the language model to assist the language model in generating a correct response to the subsequently constructed prompts;

providing the third prompt to the language model to cause the language model to generate the prompt improvement instructions; and including the prompt improvement instructions in the subsequently constructed prompts generated using the prompt construction unit.

2. The data processing system of claim 1, wherein the memory further includes instructions configured to cause the processor alone or in combination with other processors to perform operations of:

obtaining a second natural language utterance, the second natural language utterance being input via a user interface of an application;

constructing, using the prompt construction unit, a fourth prompt based on the second natural language utterance and the prompt improvement instructions to cause the language model to generate a second output;

providing, using the prompt construction unit, the fourth prompt to the language model as an input to cause the language model to generate the second output; and providing the second output to the application to cause the application to present the second output on the user interface of the application.

3. The data processing system of claim 2, wherein the memory further includes instructions configured to cause the processor alone or in combination with other processors to perform operations of:

receiving feedback from a user of the application via the user interface of the application in response to the second output, the feedback indicating that the second output was erroneous;

constructing, using the prompt construction unit, a fifth prompt that indicates that the second output was erroneous and instructs the language model to generate a second self-reflection response that indicates why the language model generated the second output;

providing, using the prompt construction unit, the fifth prompt as an input to the language model to cause the language model to generate the second self-reflection response;

constructing, using the prompt construction unit, a sixth prompt that includes the second self-reflection response and the prompt improvement instructions, the third prompt instructing the language model to update the prompt improvement instructions based on the second self-reflection response; and providing the sixth prompt to the language model to cause the language model to update the prompt improvement instructions.

4. The data processing system of claim 1, wherein constructing the third prompt instructing the language model to generate prompt improvement instructions further includes an operation of instructing the language model to include positive instructions for responding to the subsequently constructed prompts responsive to determining that the first output is not erroneous, the positive instructions providing context to reinforce correct inferences in response to the subsequently constructed prompts.

5. The data processing system of claim 1, wherein constructing the third prompt instructing the language model to generate prompt improvement instructions further includes an operation of instructing the language model to include negative instructions for responding to the subsequently constructed prompts responsive to determining that the first output is erroneous, the negative instructions providing context to the language model for correctly responding to the subsequently constructed prompts by avoiding incorrect inferences included in the first output.

6. The data processing system of claim 1, wherein constructing the third prompt instructing the language model to generate prompt improvement instructions further comprises instructions configured to cause the processor alone or in combination with other processors to perform operations of:

analyzing the first natural language utterance to determine a subject-matter domain associated with the first natural language utterance, wherein constructing the third prompt instructing the language model to generate prompt improvement instructions further comprises generating domain-specific prompt instructions to be included in subsequently constructed prompts for utterances associated with the subject-matter domain of the first natural language utterance.

7. The data processing system of claim 6, wherein analyzing the first natural language utterance to determine the subject-matter domain further comprises analyzing the first natural language utterance using a domain determination model trained to analyze a textual input and to output a subject-matter domain associated with the textual input.

8. The data processing system of claim 1, wherein the language model is implemented using a Generative Pretrained Transformer (GPT) model.

9. A data processing system comprising:

a processor; and a memory storing executable instructions that, when executed, cause the processor alone or in combination with other processors to perform operations of:

receiving a first natural language utterance, the first natural language utterance being input by a user via a user interface of an application;

constructing a first prompt based on the first natural language utterance using a prompt construction unit;

providing, using the prompt construction unit, the first prompt to a language model as an input to cause the language model to generate a first output based on the first natural language utterance;

providing the first output to the application to cause the application to present the first output on the user interface of the application;

receiving feedback from the user of the application via the user interface in response to the first output, the feedback indicating that the first output was erroneous;

constructing, using the prompt construction unit, a second prompt that indicates that the first output was erroneous and instructs the language model to generate a first self-reflection response that indicates why the language model generated the first output;

providing, using the prompt construction unit, the second prompt as an input to the language model to cause the language model to generate a second self-reflection response;

constructing, using the prompt construction unit, a third prompt that includes the first self-reflection response, the third prompt instructing the language model to generate prompt improvement instructions based on the first self-reflection response;

providing the third prompt to the language model to cause the language model to generate the prompt improvement instructions; and including the prompt improvement instructions in subsequently constructed prompts generated using the prompt construction unit.

10. The data processing system of claim 9, wherein constructing the third prompt instructing the language model to generate prompt improvement instructions further includes an operation of instructing the language model to include positive instructions for responding to the subsequently constructed prompts responsive to determining that the first output is not erroneous, the positive instructions providing context to reinforce correct inferences in response to the subsequently constructed prompts.

11. The data processing system of claim 9, wherein constructing the third prompt instructing the language model to generate prompt improvement instructions further includes an operation of instructing the language model to include negative instructions for responding to the subsequently constructed prompts responsive to determining that the first output is erroneous, the negative instructions providing context to the language model for correctly responding to the subsequently constructed prompts by avoiding incorrect inferences included in the first output.

12. The data processing system of claim 9, wherein constructing the third prompt instructing the language model to generate prompt improvement instructions further comprises instructions configured to cause the processor alone or in combination with other processors to perform operations of:

analyzing the first natural language utterance to determine a subject-matter domain associated with the first natural language utterance, wherein constructing the third prompt instructing the language model to generate prompt improvement instructions further comprises generating domain-specific prompt instructions to be included in subsequently constructed prompts for utterances associated with the subject-matter domain of the first natural language utterance.

13. The data processing system of claim 12, wherein analyzing the first natural language utterance to determine the subject-matter domain further comprises analyzing the first natural language utterance using a domain determination model trained to analyze a textual input and to output a subject-matter domain associated with the textual input.

14. The data processing system of claim 9, wherein the language model is implemented using a Generative Pretrained Transformer (GPT) model.

15. A method implemented in a data processing system for improving predictions by a language model, the method comprising:

accessing a datastore of training data using a model training unit to obtain a first training sample, the first training sample comprising a first natural language utterance, first ground truth information, the first natural language utterance requesting that content be generated by the language model, the first ground truth information providing a first example of first expected output of the language model in response to the first natural language utterance;

constructing a first prompt based on the first natural language utterance using a prompt construction unit;

providing, using the prompt construction unit, the first prompt to the language model as an input to cause the language model to generate a first output;

analyzing the first output and the first ground truth information using the model training unit to determine whether the first output is erroneous;

constructing, using the prompt construction unit, a second prompt that instructs the language model to generate a first self-reflection response that indicates why the language model generated the first output;

providing the second prompt as an input to the language model to cause the language model to generate the first self-reflection response;

constructing, using the prompt construction unit, a third prompt that includes the first self-reflection response, the third prompt instructing the language model to generate prompt improvement instructions to be included in subsequently constructed prompts for the language model to assist the language model in generating a correct response to the subsequently constructed prompts;

providing the third prompt to the language model to cause the language model to generate the prompt improvement instructions; and including the prompt improvement instructions in the subsequently constructed prompts generated using the prompt construction unit.

16. The method of claim 15, further comprising:

obtaining a second natural language utterance via a user interface of an application;

constructing, using the prompt construction unit, a fourth prompt based on the second natural language utterance and the prompt improvement instructions to cause the language model to generate a second output;

providing, using the prompt construction unit, the fourth prompt to the language model as an input to cause the language model to generate the second output; and providing the second output to the application to cause the application to present the second output on the user interface of the application.

17. The method of claim 16, further comprising:

receiving feedback from a user of the application in response to the second output, the feedback indicating that the second output was erroneous;

constructing, using the prompt construction unit, a fifth prompt that indicates that the second output was erroneous and instructs the language model to generate a second self-reflection response that indicates why the language model generated the second output;

providing, using the prompt construction unit, the fifth prompt as an input to the language model to cause the language model to generate the second self-reflection response;

constructing, using the prompt construction unit, a sixth prompt that includes the second self-reflection response and the prompt improvement instructions, the third prompt instructing the language model to update the prompt improvement instructions based on the second self-reflection response; and providing the sixth prompt to the language model to cause the language model to update the prompt improvement instructions.

18. The method of claim 15, wherein constructing the third prompt instructing the language model to generate prompt improvement instructions further includes an operation of instructing the language model to include positive instructions for responding to the subsequently constructed prompts responsive to determining that the first output is not erroneous, the positive instructions providing context to reinforce correct inferences in response to the subsequently constructed prompts.

19. The method of claim 15, wherein constructing the third prompt instructing the language model to generate prompt improvement instructions further includes an operation of instructing the language model to include negative instructions for responding to the subsequently constructed prompts responsive to determining that the first output is erroneous, the negative instructions providing context to the language model for correctly responding to the subsequently constructed prompts by avoiding incorrect inferences included in the first output.

20. The method of claim 15, wherein the language model is implemented using a Generative Pre-trained Transformer (GPT) model.

* * * * *